United States Patent
Battersby et al.

(10) Patent No.: US 6,817,312 B2
(45) Date of Patent: Nov. 16, 2004

(54) ATTACHMENT FOR A ROTARY MILKING PLATFORM

(75) Inventors: Bruce Battersby, Palmerston North (NZ); Mary Kerr, Mount Maunganui (NZ)

(73) Assignee: De Laval, Ltd, Te Rapa Hamilton (NZ)

( * ) Notice: Subject to any disclaimer, the term of this patent is extended or adjusted under 35 U.S.C. 154(b) by 0 days.

(21) Appl. No.: 10/399,176

(22) PCT Filed: Oct. 4, 2001

(86) PCT No.: PCT/NZ01/00214

§ 371 (c)(1),
(2), (4) Date: Aug. 18, 2003

(87) PCT Pub. No.: WO02/32219

PCT Pub. Date: Apr. 25, 2002

(65) Prior Publication Data

US 2004/0050332 A1 Mar. 18, 2004

(30) Foreign Application Priority Data

Oct. 16, 2000 (NZ) .................................................. 507546

(51) Int. Cl.⁷ ................................ A01J 3/00; A01J 5/00
(52) U.S. Cl. .................................. 119/14.04; 119/14.03
(58) Field of Search .......................... 119/14.04, 14.03, 119/14.08, 14.1, 14.11

(56) References Cited

U.S. PATENT DOCUMENTS

| | | | | |
|---|---|---|---|---|
| 3,835,814 A | * | 9/1974 | Jacobs et al. ............. | 119/14.04 |
| 3,877,419 A | * | 4/1975 | Rodger ..................... | 119/14.03 |
| 3,934,551 A | * | 1/1976 | Sulzberger ............... | 119/14.04 |
| 4,508,058 A | * | 4/1985 | Jakobson et al. ........ | 119/14.02 |
| 4,735,172 A | * | 4/1988 | Wahlstrom et al. ........ | 119/14.1 |
| 2004/0020442 A1 | * | 2/2004 | Martensson .............. | 119/14.04 |
| 2004/0050331 A1 | * | 3/2004 | Hein et al. ............... | 119/14.04 |

FOREIGN PATENT DOCUMENTS

| | | |
|---|---|---|
| AU | 12406/83 | 3/1983 |
| AU | 11403/95 | 1/1995 |
| NZ | 504519 | 8/2001 |
| WO | WO 98/35547 | 2/1998 |

* cited by examiner

Primary Examiner—Michael J. Carone
Assistant Examiner—Elizabeth Shaw
(74) Attorney, Agent, or Firm—Lowe Hauptman Gilman & Berner, LLP

(57) ABSTRACT

An attachment (2) for a rotary milking platform (1) characterised in that the attachment (2) is in the form of a frame surrounding at least one elongated aperture (7) positioned on or near the circumference of the rotary platform (1), the frame connected to the platform (1) by spacers (3), wherein the elongated aperture (7) can accommodate hosing associated with milking equipment.

18 Claims, 1 Drawing Sheet

ATTACHMENT FOR A ROTARY MILKING PLATFORM

TECHNICAL FIELD

This invention relates to improvements to milking systems.

Reference throughout the specification shall be made to the use of the present invention in relation to milking systems on rotary platforms. However, it should be appreciated that it is possible that the present invention can be applied to other systems.

Reference throughout the specification should be made to the animal being milked as a cow, although again it should be appreciated that the principles of the present invention could be applied to animals other than cows, which is given by way of example only.

BACKGROUND ART

Typical rotary platforms work by having a cow entering the platform at a fixed entry point after which the farmer places teat cups onto the cows. Typically the cow travels one revolution (sometimes two) of the platform before its teat cups are removed and the cow departs via a fixed exit point. As can be appreciated, the teat cups and associated hosing travel around with the cow and the platform.

The placement of the milk cluster (teat cups and hosing) in relation to the rotary platform is of considerable importance as wrong placement can lead to inefficiencies.

For example, one system has the clusters positioned on the bail leg, which is the upright support on the side of the bail or milking stall. This position allows the clusters to be washed by jetters on the bail legs. Unfortunately the problem with this arrangement is that the cows often entangle with the clusters on the deck or platform. So this is obviously a unsatisfactory situation.

Another system stores the unused clusters underneath the rotary platform. This requires the farmer to bend underneath the platform, which is inconvenient and does not make sense ergonomically. Another problem with this particular system is that the hose rubbers often cut in the process of moving them.

Another system has the hosing from the milk cluster passing through a hole in the platform. This common system was used when steel platforms were in vogue. A problem with this system is quite often the drag on the hoses from the hole causes the cups to pull off the cows. Thus skilled labour is required to ensure sufficient hosing is pulled through the hole to avoid this happening.

This problem has been excaberated with the current trend of having concrete platforms. Concrete has a number of advantages over steel, it is quieter and easier to manufacture. However, concrete is thicker than steel and thus the problems of passing of a hose through a hole in a concrete platform are greater than with steel.

For example, the applicant is recognised the importance for the cluster to be aligned with the udder. Otherwise, uneven milking or squawking can occur. The thicker concrete platform creates drag on the hoses and therefore the clusters can be skewed.

It is an object to the present invention to address the above problems, or at least provide the public with a useful choose.

Further aspects and advantages of the present invention will become apparent from the ensuing description which is given by way of example only.

DISCLOSURE OF INVENTION

According to one aspect of the present invention there is provided an attachment for a rotary milking platform, characterised in that the attachment is in the form of a frame surrounding an elongated aperture or apertures positioned on or near the outer edge of the rotary platform, wherein the elongated aperture can accommodate hosing associated with milking equipment.

In a preferred embodiment of the present invention there is provided a rotary milking platform which includes a frame which creates an elongated aperture or apertures around the circumference of the rotary milking platform, wherein the elongated aperture can accommodate hosing associated with milking equipment.

In other embodiments there is provided a method of modifying a rotary milking platform characterised by the step of adding an attachment as described above.

It should be appreciated that in one embodiment of the present invention the elongated apertures are provided by an attachment to a rotary platform. It is envisioned that this may be the case whereby the platform is concrete and the attachment may be made out of other material.

In some embodiments the present invention the elongated apertures may be formed integrally with platforms. For example, the platform may have been made of steel and the apertures merely cut out from the platform.

In other embodiments the platform may be made of concrete and the apertures moulded therein.

In preferred embodiments of the present invention the apertures are caused by an attachment in the form of a ring which encircles the outer circumference of the rotary platform. It should be appreciated that the term ring does not necessarily exclude the present invention from being formed by frames having other shapes.

For example, the platform may in some embodiments not be circular, or the framework surrounding it may be of a different shape than circular. There may be individual frames creating the apertures.

However, for ease of reference the frame which forms the apertures will be now referred to as a ring.

In some embodiments of the present invention the ring may have a number of solid blocks in addition to the apertures.

However, the preferred embodiments the ring is merely a circular band of material attached to the platform by a number of spacers. In one embodiment of the present invention, the spacer may be in the order of 35×10×50 mm. The thickness of material forming the ring may be in the order of 10×50 mm, but it should be appreciated that these dimensions are given by way of example only.

The ring may be made of any material, but in one embodiment of the present invention the ring may be made of galvanised steel.

It should be appreciated that the distance between the outer ring and the platform should ideally take into account the following considerations. Firstly, the distance or width should be such that the hoses can be readily accommodated within the elongate aperture and be able to move freely in the aperture/space.

It is preferred that the width of the aperture is sufficiently narrow that at entry or exit of the platform the cows hooves do not fall within the gap. This means that ideally a gap may be in the order of 35 mm between the ring and the platform in embodiments that have a ring.

In some embodiments the position of the spacers may be near the edge of each stall or bail on the platform. The position of the spacers defines a space in between which the hoses from the clusters can effectively float. This ability for the hoses to move within the elongate aperture (as opposed to a tight hole in a platform) means that the natural inclination of the hoses and therefore the cluster attached to the hoses will be to align with the cows udder.

This minimises previous problems with uneven milking and cup slip as well as add to the comfort of the milking process for cows.

Further, this design enables the ready incorporation of a cluster arm which can support the cluster removal. These automation obviously assists the whole milking process.

Further advantages of this configuration allows the placement of the milking clusters where they cannot entangle with the cows legs and in a position which is ergonomically of benefit to the farmers. For example, after milking, the clusters may be moved within the elongated aperture to the side of the bail allowing ready exit of the cow from the bail without entangling the clusters.

This attachment may be configured to enable it to be retrofitted to existing rotary milking platforms. This enables all the advantages as herein described to be conferred to those consumers with existing rotary milking platforms undertaking a major refit of their milking sheds, or completely replacing their rotary milking platforms. This has an additional advantage of saving the dairy farmer a large amount of money on the upgrade of their rotary milking platform.

BRIEF DESCRIPTION OF DRAWINGS

Aspects of the present invention will now be described by way of example only with reference to the accompanying figure in which.

BEST MODES FOR CARRYING OUT THE INVENTION

Figure 1:
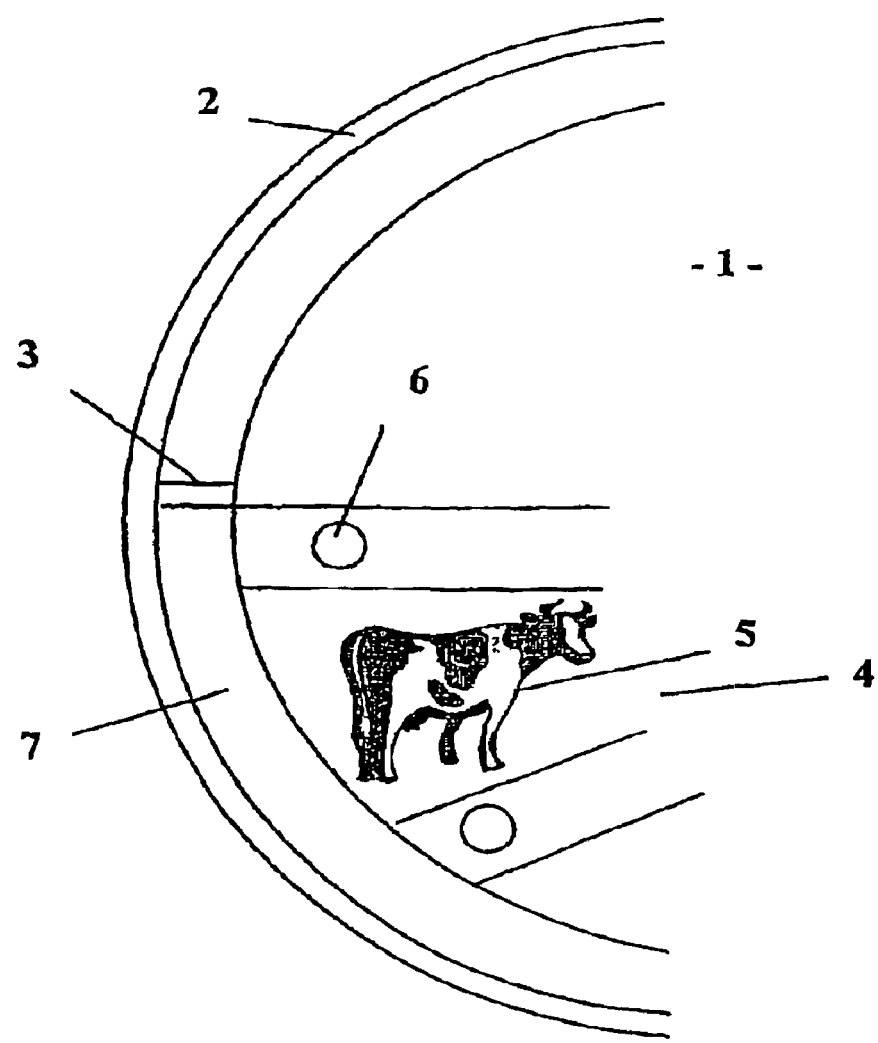
FIG. 1 is a partial view of a rotary platform incorporating the present invention.

FIG. 1 illustrates a rotary platform generally indicated by arrow 1 which incorporates a cluster ring 2.

The cluster ring 2 is connected to the platform 1 via spacers 3. Spacers 3 are positioned at the side of each of the bails 4 where the animals 5 are milked.

Alongside each bail 4 is a bail dummy 6.

The positioning of the spacers 3 can depend upon the direction of rotation of the platform. If the platform rotates clockwise as in the present invention, then the spacers 3 will be positioned to the left of the bail dummy as shown. Alternatively, if the platform rotates anti-clockwise, then the spacer for a particular bail placed to the right of the bail dummy. The placement of spacers determines the furthest that the hoses of the milking cluster can move in one direction.

It can be seen that the present invention can enable the hosing from the milking cluster to effectively float in the aperture 7 created between the ring 2 and the platform 1. This ensures that the milking cluster is naturally aligned with the udder of the animal 5. There is no restriction unlike the holes in previous platforms and the cluster can be removed to the side to have ready exit and entry of the cow 5.

Aspects of the present invention have been described by way of example only it should be appreciated that modifications and additions may be made thereto without departing from the scope of the appended claims.

What we claim is:

1. An attachment for a rotary milking platform, comprising a frame adapted to be positioned proximate to at least a portion of an outer edge of said rotary platform;
wherein said frame and said outer edge of said rotary platform define at least one elongated aperture; and
wherein said elongated aperture is adapted to accommodate hosing adapted to be attached to an animal in order to obtain milk therefrom and is also adapted to be associated with milking equipment.

2. An attachment for a rotary milking platform as claimed in claim 1 wherein a plurality of elongated apertures are defined plural attachments of said frame to said rotary platform.

3. An attachment for a rotary milking platform as claimed in claim 1 in the form of a ring encircling the outer circumference of said rotary milking platform.

4. An attachment for a rotary milking platform as claimed in claim 1 further comprising at least one block.

5. An attachment for a rotary milking platform as claimed in claim 1 further comprising a plurality of spacers adapted to attach said ring to said platform.

6. An attachment for a rotary milking platform as claimed in claim 5 wherein the dimensions of the spacers are about 35 mm×10 mm×50 mm.

7. An attachment for a rotary milking platform as claimed in claim 1 wherein the dimensions of the ring are about 10 mm×50 mm.

8. An attachment for a rotary milking platform as claimed in claim 2 wherein the dimensions of the elongated apertures are such that the hoses associated with milking equipment can be readily accommodated and be able to move freely within the aperture.

9. An attachment for a rotary milking platform as claimed in claim 2 wherein the distance of said ring from said outer periphery of said platform is such that the maximum width of each aperture is about 35 mm.

10. An attachment for a rotary milking platform as claimed in claim 5 wherein said milking platform comprises a plurality of stalls and wherein said spacers are adapted to be positioned near a radial edge of each stall on the rotary milking platform.

11. A rotary milking platform comprising a rotatable platform comprising an outer peripheral edge and at least one stall disposed inwardly of said outer peripheral edge that is adapted to have a milk producing animal positioned thereon; and a frame positioned proximate to said outer peripheral edge of said platform;
wherein said frame and said outer peripheral edge of said platform together define at least one elongated aperture around the circumference of said rotary milking platform.

12. A rotary milking platform as claimed in claim 11 wherein said elongated aperture(s) are of a size sufficient to accommodate hosing associated with milking equipment.

13. A rotary milking platform as claimed in claim 11 further comprising a plurality of spacers dividing said elongated aperture into a plurality of elongated apertures.

14. A rotary milking platform as claimed in claim 11 wherein said platform has a plurality of stalls, sized to accommodate an animal being milked, disposed about the outer periphery of said platform; and wherein each of said stalls is outer peripherally terminated by at least one of said elongated apertures.

15. A rotary milking platform as claimed in claim 14 wherein said platform is arcuate in plan shape wherein said elongated apertures are disposed entirely about said outer periphery of said platform.

16. A rotary milking platform as claimed in claim 15 wherein the plan shape of said platform is circular and wherein said stalls are pie shaped.

17. A rotary milking platform as claimed in claim 11 wherein said aperture is peripherally elongated.

18. A rotary milking platform as claimed in claim 16 wherein said aperture is circumferentially elongated.

* * * * *